July 5, 1949.  E. M. SMITH ET AL  2,475,573
MAGNETICALLY COUPLED RECORDER-INDICATING INSTRUMENT
Filed Oct. 18, 1944  2 Sheets-Sheet 1

Inventors
EDWARD M. SMITH
AND DONALD P. BERG
By Raymond W. Jenkins
Their Attorney Inventors
EDWARD M. SMITH
AND DONALD P. BERG
By Raymond D. Jenkins
Their Attorney Patented July 5, 1949

2,475,573

UNITED STATES PATENT OFFICE 2,475,573

MAGNETICALLY COUPLED RECORDER-INDICATING INSTRUMENT

Edward M. Smith, Cleveland, and Donald P. Berg, Cleveland Heights, Ohio, assignors to Bailey Meter Company, a corporation of Delaware Application October 18, 1944, Serial No. 559,152

4 Claims. (Cl. 346—146)

1

Our invention relates to apparatus for measuring variable quantities, qualities, conditions, positions and the like, and particularly to providing a visual indication by means of a pointer positioned relative to a scale or graduated member. Our invention also relates to an indicating means to be used in conjunction with a recorder to indicate at a distance the value of the condition which is being recorded on a chart by a recording pen or stylus.

One object of our invention is to provide a large indicator pointer, pivoted co-axial with a time revoluble circular recorder chart, sweeping over the chart without interfering with the pen or pens recording thereon and cooperating with a circular scale surrounding at least a portion of the recorder chart.

A further object is to provide an indicator pointer cooperating with a scale located concentrically with the chart driving hub and wherein the pointer is magnetically held by means extending through the chart driving hub from the rear of the chart and chart support.

Another object is to provide an indicator pointer positioned coaxially with the chart and arranged to be lifted out of the way for changing the chart and to be returned to driving engagement without loss of proper indicating relation.

A further object is to provide an indicator pointer driven through the chart hub in such a manner that the chart may be removed and replaced at will without disconnecting any mechanical connections between the pointer and its driver and so that synchronism therebetween will not be disturbed regardless of how often the chart is changed.

A still further object is to provide an indicating-recording instrument of the circular chart type so constructed that the chart may readily be changed without disturbing the indicator mechanism or varying the relative position between the value recorded and the value indicated by the indicating pointer.

Another object is to provide means for lifting the indicator pointer out of the way while changing the chart and simultaneously lifting the pen or pens away from the chart.

A particular object is to provide a magnetic and mechanical coupling between the pointer and its driver so arranged that when the pointer is placed in axial juxtaposition with its driver the pointer will be synchronized with the driver for proper indication.

The type of measuring instrument to which our invention is particularly directed may be

2 an indicator or an indicator-recorder of quantity, quality, condition, position or such variable. For example, the invention may be utilized in a measuring instrument adapted to indicate and record the rate of flow of a fluid, temperature, pressure, or any similar variable. For an understanding of our invention, its advantages and the specific objects obtained through its use, reference should be had to the accompanying drawing and to the specification describing the same.

Figures 1, 3, 4:
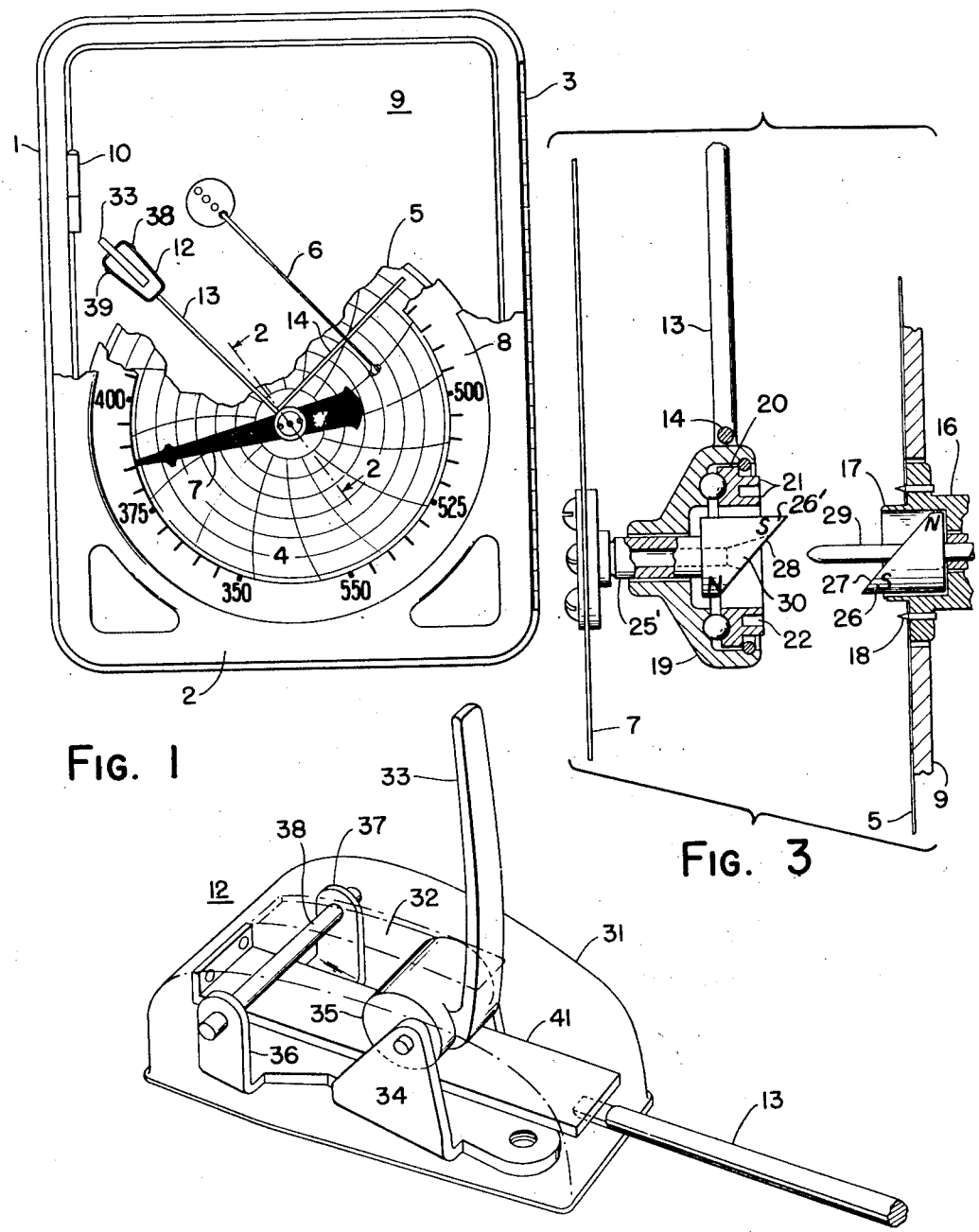
Fig. 1 is a front elevation (with the cover door partially cut away) of an indicating-recording instrument embodying a preferred form of our invention.
Fig. 3 illustrates a portion of Fig. 2 with the parts thereof in another operating position.
Figs. 4, 5 and 6 are different views of a portion of Fig. 1.

Referring now to Fig. 1, we show therein a measuring instrument of the indicating-recording type having a case 1 to which is hinged a front door 2. The door is provided with a glass 4 comprising a window through which may be viewed the record chart 5, the recording pen 6 and an indicator pointer 7. Around the periphery of the glass window 4, and carried by the door 2, we provide an indicator scale 8 with which the end of the movable pointer 7 cooperates to indicate the value of the condition being measured so that a visual indication of the condition may be had at a considerable distance from the instrument.

The door 2, hinged as at 3, may be opened to provide ready access to the pointer, recording pen, and chart. Furthermore, the opening of the door 2 provides access to a hinged chart mounting plate 9 hinged as at 10. In the particular construction being described the door 2 opens toward the right, whereas the back plate 9 opens toward the left. Mounted on the rear of the door 9 is a chart drive clock 11. Some of the measuring apparatus for positioning the pen 6 may be carried on the rear of the back plate 9, or in any event the opening of the back plate exposes the complete interior of the meter case 1.

Figure 5:
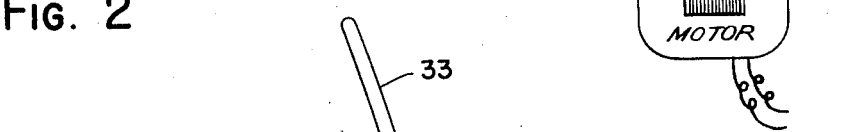
Figure 5:
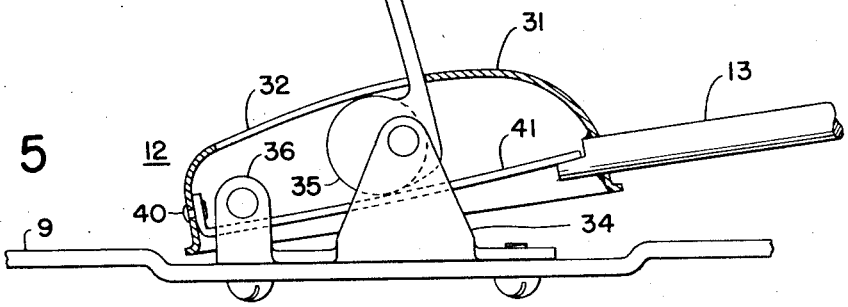
Figure 6:
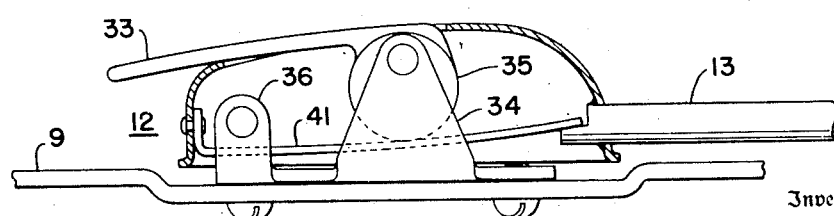

Mounted on the back plate 9 we provide a mechanism generally indicated at 12 having an extension arm 13 joining the pointer carrying mechanism and having a further extension 14 providing a pen lifter. Figs. 4, 5 and 6 show the mechanism 12 in greater detail and in different positions of operation.

Figure 2:
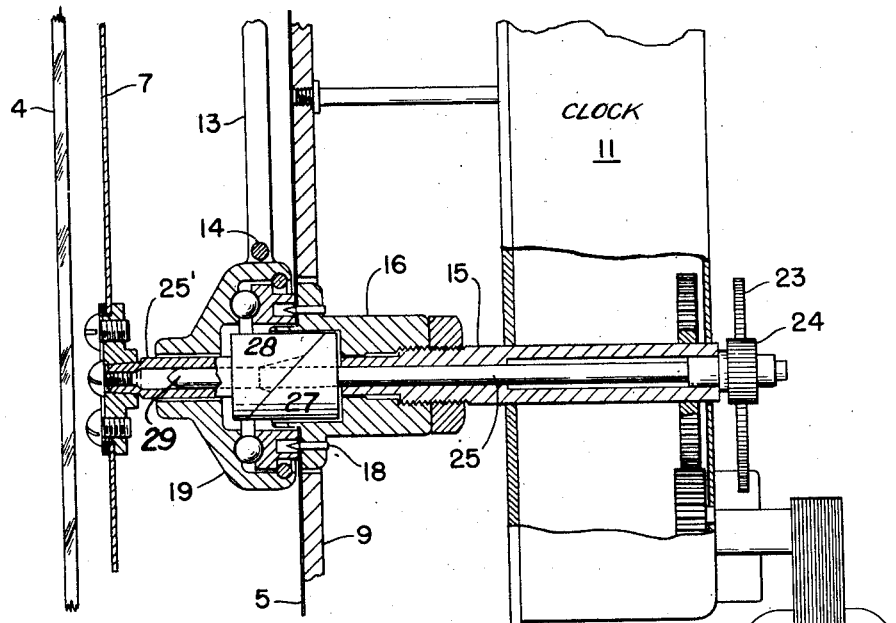
Fig. 2 is a sectional elevation of a portion of Fig. 1, along the line 2—2, in the direction of the arrows.

Referring now in particular to Figs. 2 and 3, we show therein that the clock 11, supported from the back plate 9, drives through suitable means (not shown) a chart rotating spindle 15. Usually the tubular spindle 15, and chart 5, are adapted to make one complete revolution in twenty-four hours. Fastened to, and rotated by the spindle 15, is a member 16 having a circular front surface flush with the front of the back plate 9 and a forwardly extending hub 17 of an outside diameter to receive the central hole of the chart 5. The member 16 is provided with a plurality of forwardly projecting sharp pins 18 for piercing the chart 5 and holding the same for rotation by the member 16. In other words, the chart 5 is centered over the hub 17, properly turned by hand until the pen 6 indicates the proper time ordinate and then the chart 5 is depressed over the pins 18 by means of bearing race 20 whereupon it lies flush on the front of the back plate 9. Thereafter rotation of the spindle 15 and member 16 will rotate the chart 5 upon the face of the back plate 9. Fig. 3 shows the position of the chart 5 just described.

Positioned by and with the arm 13 is a member 19 adapted to be moved through an arc about shaft 38 toward and away from the chart receiving hub 17. Shrouded by the member 19 is a rotatable member 20 having a skirt 21 engageable with the chart 5 on the member 16 to grip the chart 5 between the members 20 and 16. In the skirt 21 is an annular groove 22 to receive the points of the pins 18. Thus when the assembly comprising the members 19 and 20 is in its position (Fig. 2) furthest toward the right, the chart 5 is firmly gripped between the skirt 21 and the member 16 with the pins 18 puncturing the chart. Thereafter rotation of the member 16 will drive the chart angularly, and with it the member 20; the member 19 remaining stationary.

By the description so far it will be apparent that means are provided for rotating the chart 5 at a uniform speed by any common clockwork. The chart is normally rotated once in twenty-four hours, and thereupon the pen 6 draws the record.

For indicating the value which the pen 6 is recording, or other values, we provide that the pointer 7 be angularly positioned relative to the scale 8. A sector 23 drives a pinion 24 rotating a shaft 25 extending through the tubular spindle 15 and the member 19, to rotate an extension shaft 25' and the pointer 7. As an important feature of our invention we separate the pointer driving means into two parts 25, 25' so that the pointer, member 19, and shaft part 25' may be moved away from the chart hub 17 (Fig. 3) when it is desired to change charts.

Near the end of the shaft 25 we provide a cylindrical magnet 26 having a sloped end surface 27. On the end of the shaft 25' we provide a mating cylindrical magnet piece 26' having a sloped end surface 28. The magnets 26 and 26' are oppositely magnetized, i. e. (for example) the tip of the slope 27 may be a south pole and the heel of slope 27 may be a north pole, while the heel of the sloped surface 28 may be a north pole and its tip a south pole. Thus with the assembly as shown in Fig. 2 the magnets are in complementary position. Through the center of the magnet 26 we extend the shaft 25 to form a guiding end 29 receivable in the bore 30 of the magnet 26' and of the shaft 25'.

In normal operating position (as shown in Fig. 2) the guiding end 29 is within the tubular shaft 25', whereas the mating surfaces 27, 28 are magnetically locked together. A particular feature of the present invention is that should the pointer 7, shaft 25', and magnet 26' be moved angularly while away from the mating surface 27 (Fig. 3) they will automatically become aligned and in driving synchronism when closed together as shown in Fig. 2. As the mating surfaces 27, 28 approach each other the magnetic force will tend to align them in true complement while the magnet 26' is guided on the portion 29. Such angular movement caused by the magnetic attraction between the two opposite poles will move the pointer 7 to its proper indicating position (relative to the scale 8) in accordance with the position of the driving means 23, 24. Thus at any time that the surfaces 27, 28 are moved apart, as in Fig. 3, the possibility of returning the parts into driving engagement with the pointer 7 reading incorrectly is eliminated.

Inasmuch as normal movement of the pointer 7 and member 19 is not axially in line with the shaft 25 but is over a long radius arc about shaft 38 we slightly enlarge the bore 30 at its emergence through the face 28 so that the guiding portion 29 will positively enter the bore 30 regardless of the position in angular movement of the magnet 26' and pointer 7. It will be observed that shaft 25' is purposely loose in member 19 so that in operating position (Fig. 2) member 19 does not form a bearing for 25' and there is no contact between members 19 and 25' in the pointer driving position. The free bearing between 19 and 25', as well as the relief of bore 30 (right-hand entrance Fig. 3) permit radial and axial motion of 25' when engaging with shaft end 29 while member 19 moves through an arc. The free bearing also eliminates necessity of maintaining exact coincidence or axial alignment of 19, 25 and 25'.

Through the agency of the assembly 12 and the arm 13 the pointer 7, member 19 and magnet 26' are moved away from the chart 5 and magnet 26 (see Fig. 3). Figs. 4, 5 and 6 show in greater detail the construction of the assembly 12.

An enclosing housing 31 takes the general shape of an inverted cup open at the bottom. In the top is an elongated slot 32 in which is movable a release lever 33 substantially filling the opening 32 in the position shown in Figs. 1 and 6 corresponding to the assembly Fig. 2. The positions of the parts in Figs. 4 and 5 correspond to Fig. 3.

Mounted on the back plate 9 is a bearing support member 34 to which is pivotally mounted a cam 35 integrally formed as an extension of the lever 33. The member 34 also has bearing pieces 36, 37 in which is journaled a shaft 38 whose ends extend beyond the bearings 36, 37 and are riveted or otherwise fastened as at 39 (Fig. 1) to the housing 31. Thus the housing 31, and arm 13 carried thereby, pivots around the members 36, 37 through the agency of shaft 38.

Fastened to the housing 31, as by the rivets 40, is a leaf spring 41 whose opposite end engages the arm 13. This leaf 41 serves primarily as a safety device to prevent damage to arm 13 if for any reason the assembly fails to seat normally. It also serves the purpose of confining the cam 35 between itself and the upper interior of the housing 31, thus putting a slight braking action upon the cam to hold the assembly in any given cam position limited by movement of the lever arm 33 within the slot 32.

It will be seen that the position of the members shown in Fig. 6 dictates a position of the arm 13 most adjacent the chart 5 and back plate 9 and results in the showing of Fig. 2. If it is now desired to lift the pointer 7, the member 19, the pen lifter 14, and the pen 6 away from the chart 5 so that the chart may be removed from the pins 18 and hub 17 and replaced by another chart or rotated angularly for correct timing, then the hand lever 33 is moved to the position shown in Figs. 4 and 5. Viewing Fig. 5, a clockwise lifting of the lever 33 moves the cam 35 in clockwise rotation, thus tending to raise the housing 31 in counterclockwise rotation around its pivots 39 of shaft 38. Such angular positioning of the housing 31 elevates the end of the arm 13 which is attached to the member 19, thus lifting the member 19 and associated parts away from the chart 5. By the same motion the pointer 7 is moved out of the way, as is the pen lifter 14 carrying the pen 6. Thereafter the chart 5 is free for removal from the hub 17 and pins 18.

After a new chart has been placed on a hub 17 and properly located as to time ordinate it is depressed onto the pins 18. The arm 33 is moved in counterclockwise rotation, thus moving the member 19 toward the back plate 9. The shaft extension 29 enters the opening 30, the magnet surfaces 27, 28 move into alignment and are magnetically coupled so that the magnet 26 drives or positions the pointer 7. If, while the parts are apart as in Fig. 3, the pointer 7 is moved out of proper synchronism with the driving magnet 26, then when the faces 27, 28 approach each other the combination of magnetic attraction between the surfaces 27, 28 and the conformation of said surfaces results in an angular movement of the magnet 26', and pointer 7, until the magnet faces 27, 28 are properly lined up and seat or couple together.

In general, when the arm 13 and parts carried thereby are moved toward the chart, the axial alignment of parts is mechanical, the radial synchronization is both magnetic and mechanical, and thereafter they are magnetically locked in driving position.

From the foregoing description it will be apparent that we have provided an improved means for positioning an indicator pointer, an improved means for moving a pointer and pen out of the way when it is desired to change charts and an improved means for synchronizing the pointer when returned into driving position. Other features and advantages will be apparent from a study of the disclosure.

Reference may be had to our copending continuing application S. N. 61,156, filed November 20, 1948, which claims certain features of our present invention disclosed herein.

What we claim as new, and desire to secure by Letters Patent of the United States, is:

1. In a recording-indicating instrument having a chart and means for making a record on the chart, the combination comprising a first shaft member supported for rotation in response to changes in a value to be measured, a chart mounting plate coaxially rotatable relative to and about said first shaft member, a second shaft member carrying an indicator for showing the angular position of said first shaft member, carrying means rotatably receiving said second shaft member, means supporting said carrying means and second shaft member for bodily movement toward and away from the first shaft member and the chart mounting plate to clamp the chart to said plate, and a pair of magnetic coupling elements fixed respectively to the adjacent ends of said first and second shaft members and arranged for direct engagement when the carrying means is moved toward the chart mounting plate, said magnetic elements being formed with inclined complemental end faces each having two poles of opposite polarity and constituting the elements of a mechanical coupling opposing relative angular movement of said shaft members when said faces are in direct engagement.

2. In a recording-indicating instrument having a chart and means for making a record on the chart, the combination comprising a first shaft member supported for rotation in response to changes in a value to be measured, a chart mounting plate mounted on said first shaft member for rotation relative thereto, a second shaft member carrying an indicator on its outer end portion for showing the angular position of said first shaft member, carrying means receiving said second shaft member, an annular chart clamping member rotatably mounted in said carrying means in spaced relation to the inner end portion of said second shaft member, means supporting said carrying means, second shaft member and chart clamping member for bodily movement in a predetermined path toward the first shaft member and the chart mounting plate to clamp the chart and away therefrom to provide access to said mounting plate, and a pair of magnetic coupling elements fixed respectively to the adjacent ends of said first and second shaft members, said magnetic elements being formed with inclined complemental end faces each having two poles of opposite polarity and constituting the elements of a mechanical coupling opposing relative angular movement of said shaft members when said faces are in direct engagement.

3. In a recording-indicating instrument having a chart and means for making a record on the chart, the combination comprising a first shaft member supported for rotation in response to changes in a value to be measured, a chart mounting plate mounted on said first shaft member for rotation relative thereto, a second shaft member carrying an indicator for showing the angular position of said first shaft member, carrying means loosely receiving said second shaft member for rotation therein, means supporting said carrying means and second shaft member for bodily movement in a predetermined arcuate path toward and away from the first shaft member and the chart mounting plate to clamp the chart to said plate, and a pair of magnetic coupling elements fixed respectively to the adjacent ends of said first and second shaft members and arranged for direct engagement when the carrying means is moved toward the chart mounting plate, said magnetic elements being formed with inclined complemental end faces constituting the elements of a mechanical coupling opposing relative angular movement of said shaft members when said faces are in direct engagement, one of said end faces having a central projecting guiding portion and the other of said end faces having a central bore with an enlarged opening for receiving said guiding portion as the magnets are moved into direct engagement.

4. In a recording-indicating instrument having a chart and means for making a record on the chart, the combination comprising a first shaft member supported for rotation in response to changes in a value to be measured, a chart mounting plate mounted on said first shaft member for rotation relative thereto, a second shaft member carrying an indicator for showing the angular position of said first shaft member, carrying means loosely receiving said second shaft member for rotation therein, an annular chart clamping member rotatably mounted in said carrying means in spaced relation to the inner end portion of said second shaft member, means supporting said carrying means, second shaft member and chart clamping member for bodily movement in a predetermined arcuate path toward and away from the first shaft member and the chart mounting plate to clamp the chart to said plate, and a pair of magnetic coupling elements fixed respectively to the adjacent ends of said first and second shaft members and arranged for direct engagement when the carrying means is moved toward the chart mounting plate, said magnetic elements being formed with inclined complemental end faces constituting the elements of a mechanical coupling opposing relative angular movement of said shaft members when said faces are in direct engagement, one of said end faces having a central projecting guiding portion and the other of said end faces having a central bore with an enlarged opening for receiving said guiding portion as the magnets are moved into direct engagement.

EDWARD M. SMITH.
DONALD P. BERG.

REFERENCES CITED

The following references are of record in the file of this patent:

UNITED STATES PATENTS

| Number | Name | Date |
|---|---|---|
| 1,174,787 | Wilkinson | Mar. 7, 1916 |
| 2,074,116 | Stein | Mar. 16, 1937 |
| 2,074,117 | Ross | Mar. 16, 1937 |
| 2,124,832 | Schofield | July 26, 1938 |
| 2,226,287 | Miller | Dec. 24, 1940 |
| 2,244,653 | Meer | June 2, 1941 |
| 2,288,688 | Dubilier | July 7, 1942 |
| 2,307,912 | Bean et al. | Jan. 12, 1943 |
| 2,353,740 | Malone | July 18, 1944 |
| 2,417,339 | Woolley | Mar. 11, 1947 |